United States Patent
Siegfriedsen (10) Patent No.: US 8,426,993 B2
(45) Date of Patent: Apr. 23, 2013

(54) WIND POWER PLANT

(75) Inventor: Sonke Siegfriedsen, Drage (DE)

(73) Assignee: Aerodyn Engineering GmbH, Rendsburg (DE)

( * ) Notice: Subject to any disclaimer, the term of this patent is extended or adjusted under 35 U.S.C. 154(b) by 773 days.

(21) Appl. No.: 12/532,559

(22) PCT Filed: Apr. 22, 2008

(86) PCT No.: PCT/DE2008/000682
§ 371 (c)(1),
(2), (4) Date: Dec. 4, 2009

(87) PCT Pub. No.: WO2008/131727
PCT Pub. Date: Nov. 6, 2008

(65) Prior Publication Data
US 2010/0096855 A1 Apr. 22, 2010

(30) Foreign Application Priority Data
Apr. 25, 2007 (DE) .......................... 10 2007 019 513

(51) Int. Cl.
*F03D 9/04* (2006.01)
(52) U.S. Cl.
USPC .............................................. 290/44; 290/55
(58) Field of Classification Search ............ 290/44, 290/55
See application file for complete search history.

(56) References Cited

U.S. PATENT DOCUMENTS

| | | | | |
|---|---|---|---|---|
| 4,561,826 A | * | 12/1985 | Taylor | 416/19 |
| 5,518,370 A | * | 5/1996 | Wang et al. | 416/246 |
| 5,746,576 A | * | 5/1998 | Bayly | 416/16 |
| 2006/0001268 A1 | | 1/2006 | Moroz | |
| 2007/0205602 A1 | * | 9/2007 | Willey et al. | 290/44 |
| 2008/0084068 A1 | * | 4/2008 | Shibata et al. | 290/44 |

FOREIGN PATENT DOCUMENTS

| | | |
|---|---|---|
| DE | 3201199 | 7/1983 |
| DE | 19717059 | 7/1998 |
| DE | 10058076 | 6/2002 |
| EP | 0709571 | 5/1996 |
| EP | 1340910 | 9/2003 |
| NL | 1009566 | 1/2000 |
| WO | 95/00757 | 1/1995 |
| WO | WO 03058062 A1 * | 7/2003 |

* cited by examiner

*Primary Examiner* — Tulsidas C Patel
*Assistant Examiner* — Viet Nguyen
(74) *Attorney, Agent, or Firm* — Diederiks & Whitelaw, PLC (57) ABSTRACT

A wind power plant, comprising a tower, a rotor mounted on the tower and having at least one rotor blade, and a power conversion unit, is characterized by a swivel bearing, the swiveling plane of which lies between an approximately horizontal rotor axis (x) and a vertical tower axis (y), at least one motor for swiveling the rotor, along with the power conversion unit, from a first position in which the rotor axis (x) extends at least approximately in a horizontal direction into a second position in which the rotor axis (x) extends at least approximately in a vertical direction.

19 Claims, 7 Drawing Sheets

WIND POWER PLANT

CROSS-REFERENCE TO RELATED APPLICATIONS

This application represents a National Stage application of PCT/DE2008/000682 entitled "Wind Power Plant" filed Apr. 22, 2008, pending.

BACKGROUND OF THE INVENTION

The invention relates to a wind power plant comprising a tower and a rotor that is mounted on the tower and has at least one rotor blade, and a power conversion unit for generating electrical power from the kinetic energy of the natural movement of air.

The use of wind energy to generate electrical power is increasing in importance. However, a technical difficulty with this kind of environmentally sustainable type of generating electrical power is the unsteadiness of the wind. The problem arising from the use of wind energy, of being able to use wind for power generation that at times only blows weakly, is at the same time foiled by the problem that also very high wind speeds can occur at which the wind power plants have to be shut down to prevent damage to the wind power plants by the aerodynamic forces of the wind. However, a wind power plant is not only damaged by high wind speeds, but also by the turbulence intensity of the wind speed. At the same time, the turbulence intensity is defined as the quotient of the standard deviations of the wind speed variation and the mean value of the wind speed $$I = \frac{\sigma}{v_m}.$$

For areas on the Earth that are not affected by tropical cyclones and exhibit wind speeds as wind gust peak values of not more than 70 m/s, there exist technical solutions that safely protect the plants against damage. In these areas, the turbulence intensity steadily decreases with increasing wind speeds. In a severe hurricane the value of the turbulence intensity is markedly below 10%.

In regions where tropical cyclones occur, the situation is totally different. As experiences with wind farms in southern China over the last years show, wind power plants are not up to cyclone of the classes 4 and 5, i.e. wind speeds of over 60 m/s, if the eye of the cyclone travels through the wind farm. In 2006, 25 out of 28 plants of a wind farm were severely damaged in the province of Zhejiang, and about 10 plants were beyond use. Here the rotor blades broke off, nacelles fell from their tower, towers snapped, tower flanges were torn apart, and even foundations were pulled out of the ground. The maximum wind speeds were measured to be 86 m/s. Most wind power plants are only designed for a maximum wind speed $V_w$ of 60 m/s with a safety margin of 1.35 for the loads.

The last years have shown that the number of cyclones is rising strongly and therefore also the danger of greater damage in wind farms that are at risk. Due to the strongly rising spread of wind power use worldwide, wind power plants are also increasingly erected in regions with a risk of cyclones (e.g. India, China, Taiwan, Japan etc.).

What is particular about cyclones is, that not only does the wind speed rise strongly in the wall of the eye of the cyclone but at the same time the turbulence intensity increases to an extreme extent. The wind speeds can reach 90-100 m/s with at the same time a turbulence value intensity of 60%. A rotor blade that is hit by such an air movement transverse to the longitudinal axis of the blade has no chance of surviving this without any damage. The aerodynamic excitation by such a strongly turbulent current leads to extreme oscillations in the blade structure in the edgewise and flapwise directions that are very likely to lead to a total destruction.

Dimensioning the structure with respect to such high loads would lead to very high blade weights and also increase the costs of the whole plant significantly and thus degrade the cost-effectiveness markedly.

A particular problem also occurs in the event of offshore plants that have been erected in regions with a risk of cyclones. Since they are erected in the water off the coast they would be hit by the cyclones at a point when their energy has not yet diminished and the wind speeds are still higher. For a larger number of offshore wind farms in these regions there is a high likelihood that there will be considerable damage each year. This is not acceptable since the operating and repair costs would rise dramatically and as a result insurance companies would not insure such projects and banks would not finance such an undertaking.

In the meantime, different measures have been suggested that transfer in the event of very high wind loads the rotor blades and/or the rotor resp. the nacelle into a position in which these components of the wind power plant present a small area of attack for the wind and thus assume a position with low wind resistance. For example DE 100 58 076 A1 shows such a plant that brings the rotor blades, when a strong wind comes up, vertically to the direction of the wind into the feathering position and rotates the rotor from the upwind into the downwind position when the wind force increases. Thus the plant can track the wind and therefore presents the smallest wind resistance for the entire plant. When considering the individual rotor blade, then despite this it can be flown against transverse to the longitudinal axis as a function of the rotor position. Due to the strong turbulence in a cyclone there will nonetheless be a strong excitation of the structure. Destruction continues to be very likely.

A further invention known from EP 0 709 571 A2 transfers the nacelle with a two-blade rotor into a position relative to the wind direction such that the one blade is flown against from the blade tip. The approach to reduce the loads decidedly is given, however in practice the system would not function since the system is unstable. A deviation of the direction of the wind relative to the longitudinal axis of the blade would create additional moments that the active wind-direction tracking unit must correct in a highly dynamic manner. If this cannot be achieved quickly enough, the moments that want to rotate the rotor at right angles to the direction of the wind in the downwind direction of the tower will become ever greater and the system turns unstable. The conditions of a cyclone will also not be survived by such a configuration.

SUMMARY OF THE INVENTION

The object of the invention is therefore to provide a wind power plant that at extreme wind speeds and turbulences as they exist in cyclones to bring the rotor blades into a position relative to the mean direction of the wind where a flow against the rotor blade essentially takes place only in the longitudinal direction of the blade and avoids the highly-loaded cross currents with dangerous load excitation and the rotor blade tracks itself in a stable manner into this low-load position automatically even when the direction of the wind changes, so that the load for the entire plant is minimized in this way.

The basic idea of the invention is to provide a wind power plant where the rotor can be moved from a first position, that has an at least approximately horizontal alignment of the rotor axis x for generating power, into a second position in which the wind power plant is protected against damage by aerodynamic wind loads that are too high and act on the plant. According to the invention; in the second position (parking position) the rotor assumes the position comparable to a, in the case of a helicopter with a rotor axis that is arranged at least approximately vertically.

The tilting of the rotor axis x about appr. 90° that is required for this is achieved by swiveling two elements through 180° in a swiveling plane that is arranged between the rotor axis x, that is arranged at least approximately horizontally in the first position and the vertical tower axis y.

In this case it is preferable that the swiveling plane in which the rotor is swiveled relative to the tower lies in the angle bisector between the at least approximately horizontal rotor axis x in the first position and the vertical tower axis y, particularly preferably the rotor axis x and the tower axis y intersecting in the swiveling plane. This ensures that the rotor axis x and the tower axis y are aligned flush in the parking position.

Furthermore it is provided that swiveling the rotor is not effected until a measured or a predetermined wind speed is exceeded, it being understood that swiveling can also be controlled manually, for example by a control center, if for example there is the threat of a cyclone acting. In this case it is for example also possible for several wind power plants, combined to form a group, to be controlled jointly.

The power conversion unit of the wind power plant preferably exhibits a rotor bearing, a gear-box, a generator, and a brake. The rotor with only one rotor blade and a counterweight being particularly preferred.

The wind power plant according to the invention in a preferred implementation finally also has power storing means that store part of the power generated during the operation of the plant and make this available for the swiveling movement of the rotor if the plant has already been shut down or the grid is no longer available and the rotor is to be brought from the first position into the second position.

As an alternative thereto it also possible for an emergency generating set driven by an internal combustion engine to provide the power necessary for the swiveling process.

BRIEF DESCRIPTION OF THE DRAWINGS

The invention will be explained in more detail with reference to drawings, in which:

FIG. 1 shows an illustration of the inventive principle for protecting the wind power plant against damage caused by extreme wind loads;

FIG. 2 shows a schematic illustration of a particularly preferred exemplary embodiment of an offshore wind power plant according to the invention; and FIG. 3 shows a schematic illustration of an exemplary swiveling mechanism necessary for carrying out the inventive swiveling movement.

DETAILED DESCRIPTION OF THE INVENTION

Figure 1A:
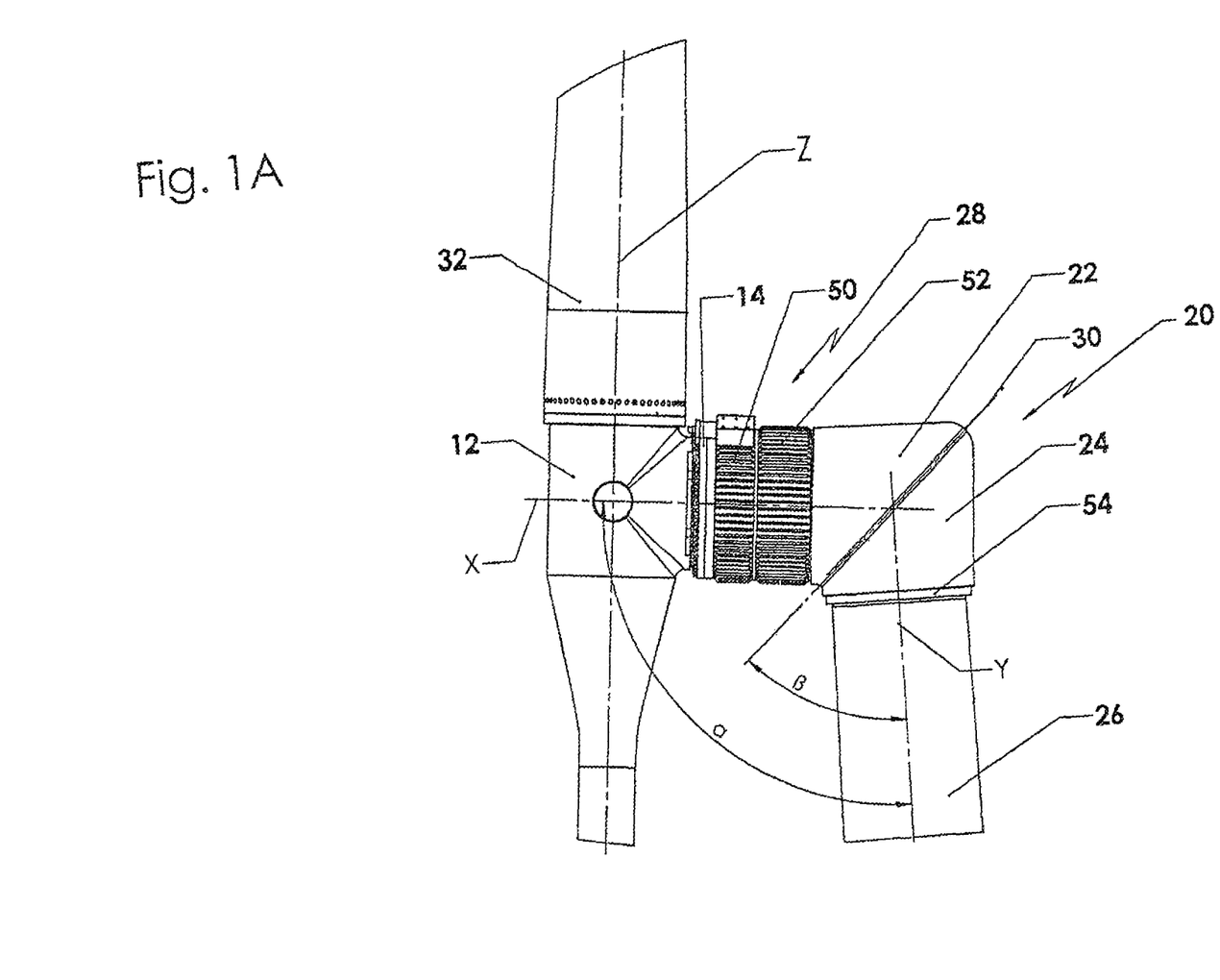

FIG. 1A shows a schematic illustration explaining the inventive principle for protecting wind power plants against damage caused by extreme wind loads, with reference to a two-part head support 20. The head support 20 consists of two individual elements 22, 24 that are independent of each other and that are connected to each other in a swiveling plane 30 such that one element 22 can be swiveled relative to the other element 24. By means of a vertical bearing 54 the element 24 is connected to the tower 26 of the wind power plant. The element 22 is connected to the power conversion unit 28.

In this preferred example, the power conversion unit 28 consists of a rotor shaft 14 that is mounted in a rotor bearing (not shown), a gearbox 50, and a generator 52. The power conversion unit 28 can, however, also consist of only one rotor bearing and one generator 52.

The swiveling plane 30 in which the two elements 22, 24 can be swiveled relative to each other in the example shown, is formed in present case by the angle bisector between the at least approximately horizontal rotor axis x and the vertical tower axis y. The arrangement of the two axes x, y is preferably selected such that they intersect in the swiveling plane 30. This ensures that the rotor axis x in the second position is flush with the tower axis y. However, the elements 22, 24 do not have to be identical, but can moreover also be of differing design, as long as it is ensured that the element 22 can swivel on the element 24. Conventionally the angle α between the tower axis y and the rotor axis x is in the range 90° to 98°. This results in a favorable angle β for the swiveling plane 30 of 45° to 49°.

Figure 1B:
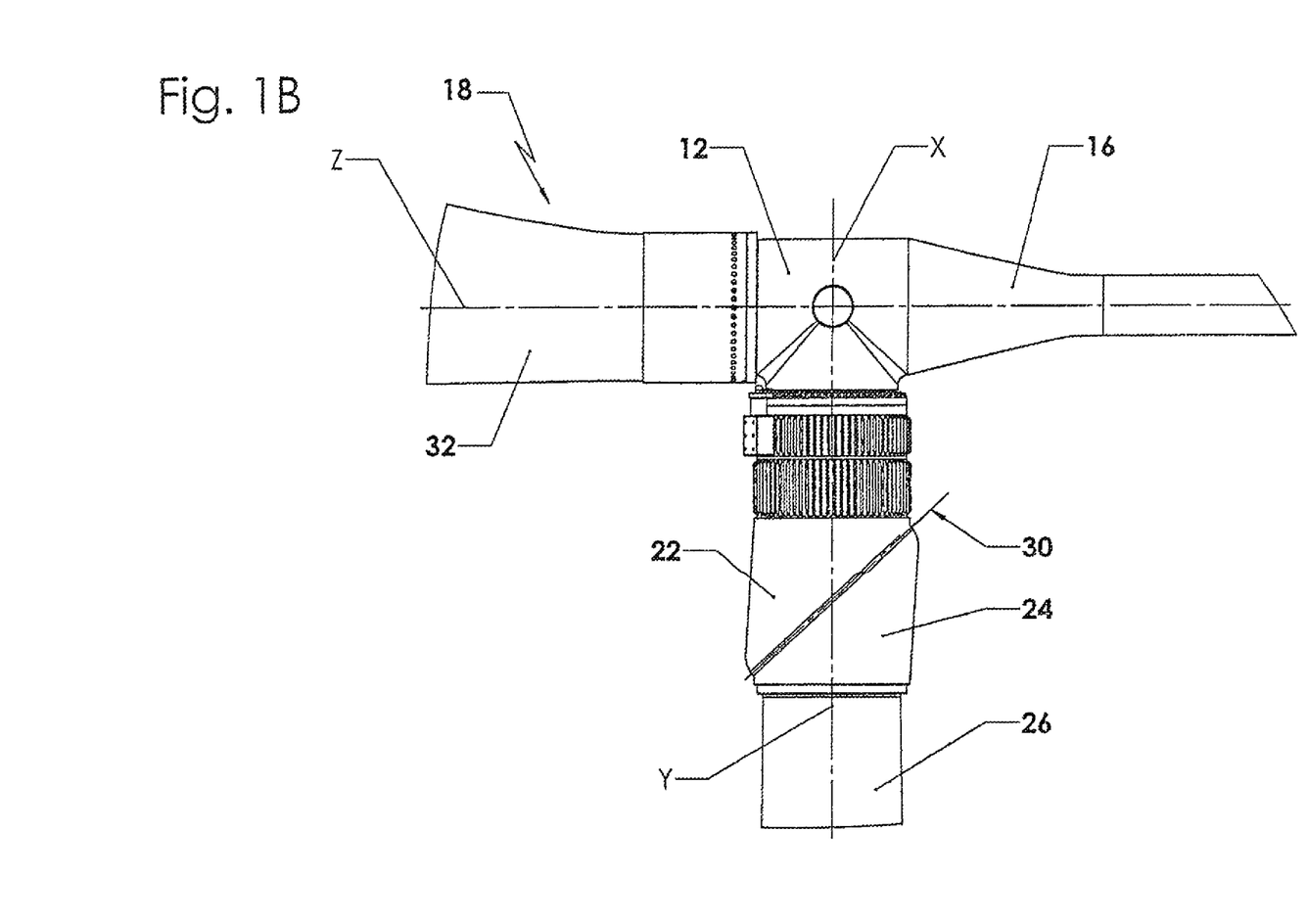

FIG. 1B shows the wind power plant in the second position and the element 22 twisted by 180° relative to the element 24.

Since the element 22, as a component part of a nacelle of a wind power plant, carries the rotor 18 of the wind power plant, the rotor 18 will be swiveled by rotating the element 22 from a first position that is usually assumed for generating power, into a second position where the blade longitudinal axis z of the rotor blades 32 attached to the rotor 18 is no longer oriented in an at least approximately vertical plane, but at least approximately horizontally (helicopter position). In this context the rotor 18 of the inventive wind power plant is in the present example a single-blade rotor 18 with a rotor hub 12, a single rotor blade 32, and a rotor-blade counterweight 16.

FIG. 2 clarifies the considerations made concerning the explanation with reference to FIG. 1 in the form of a particularly preferred exemplary embodiment of an offshore wind power plant 10 with a single-blade rotor 18. The offshore wind power plant 10 consists of a tower 26 mounted on a foundation, and a nacelle arranged thereon that consists—as shown in FIG. 1—of two elements 22, 24 and the power conversion unit 28, the element 24 being connected to the tower 26 of the wind power plant. In this case the element 24 will be connected to the tower 26 via a vertical bearing 54 preferably such that it can rotate, so that the rotor axis x can be aligned toward the mean direction of the wind.

The element 22 carrying the rotor 18 is connected to the element 24 so that it can swivel in the swiveling plane 30.

Figure 2A:
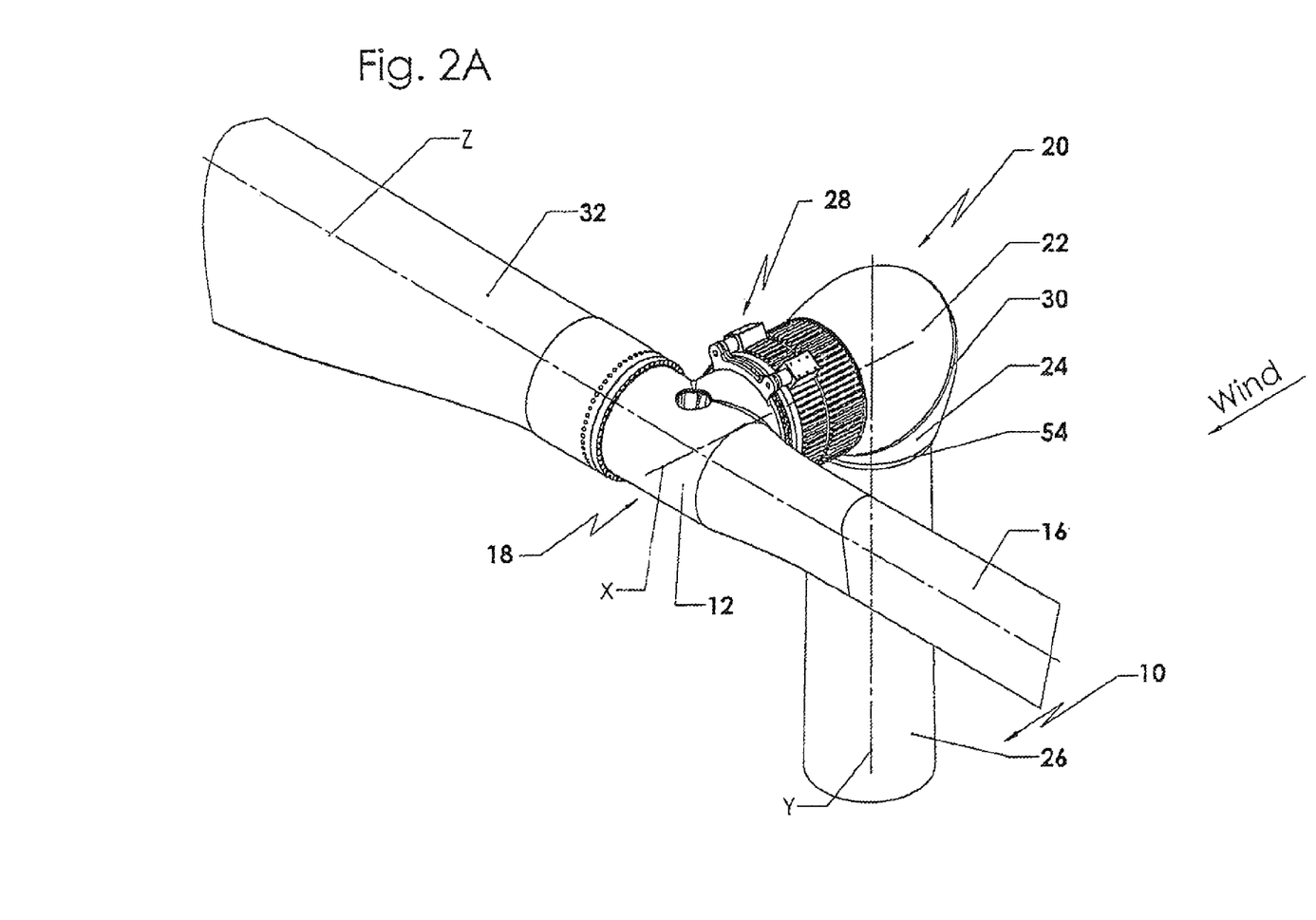

In a first position for generating power, the rotor 18 of the inventive wind power plant will assume the attitude shown in FIG. 2A, so that the rotor axis x is aligned approximately horizontally. In the case of high wind speeds that can lead to the wind power plant being damaged, the rotor 18 is at first braked in a horizontal blade position, thereafter the element 22 is swiveled relative to the element 24 in a manner analogous to the example shown in FIG. 1, so that the rotor 18 can be moved from the first position shown in FIG. 2A into the second position shown in FIG. 2C, the one rotor blade 32 of the rotor 18 having in addition been moved into the downwind position relative to the tower in the example shown.

Figure 2B:
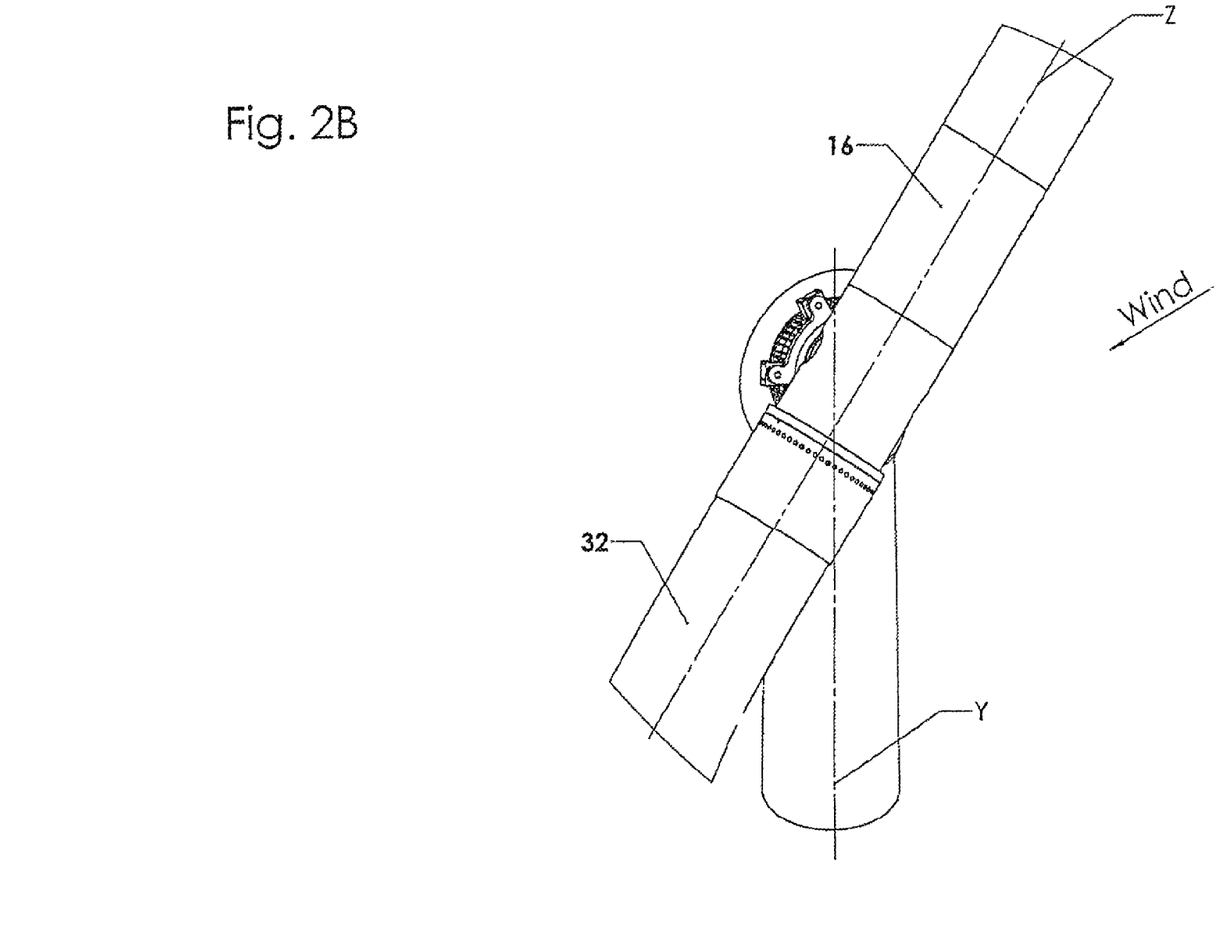
Figure 2C:
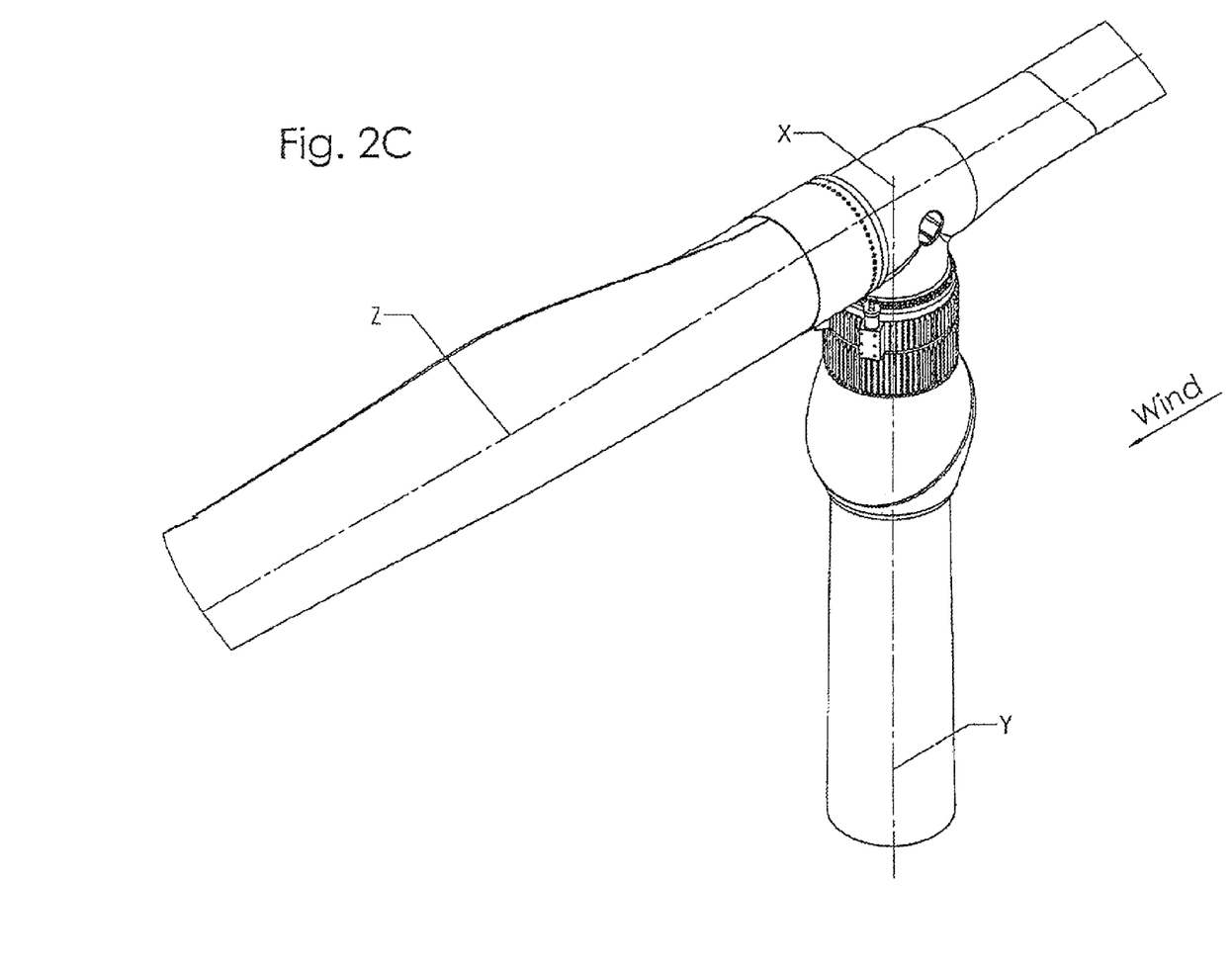

With this horizontally aligned blade longitudinal axis z in the downwind side relative to the tower axis y or rotor axis x, the one rotor blade can no longer be flown against at right angles to the blade longitudinal axis z in the case of a typhoon. Rather the rotor 18 is only flown against from the side of the counterweight 16 along the blade longitudinal axis z. Due to the rotor 18 being free to rotate about the rotor axis x, the rotor blade 32 will always track itself to this direction when the direction of the wind changes, so that the rotor blade 32 is never flown against at right angles to the blade longitudinal axis z and thus the destructive incoming flow is avoided. FIG. 2B shows an intermediate position after swiveling through appr. 90°.

For this swiveling movement all elements mechanically connected to the rotor 18, such as rotor bearing, gearbox 50, and generator 52, have to be swiveled likewise. For carrying out the swiveling movement, the two elements 22, 24 are preferably connected to one another by means of a sliding bearing. However, a ball bearing can be provided as well.

The inventive wind power plant furthermore has at least one sensor for detecting the wind speed, particularly preferably a control unit being provided that causes the rotor 18 to be braked preferably in the horizontal position of the blade and then the element 22 to be swiveled from the first position into the second position when a predetermined wind force is exceeded. If several plants in a wind farm are used, it can also be provided that only some sensors are provided and the measured data are each passed to the wind power plants arranged in the wind farm, so that individual or also groups of wind power plants can be switched off by moving the rotor 18 from the first into the second position. Switching off a complete wind farm can also be triggered manually by a central control command when it is detected that extreme conditions for example of a cyclone are approaching.

FIG. 3 shows the swivel bearing that is arranged in the swivel plane 30 in the design as a sliding bearing (A) and with a slewing ball bearing (B).

Figure 3A:
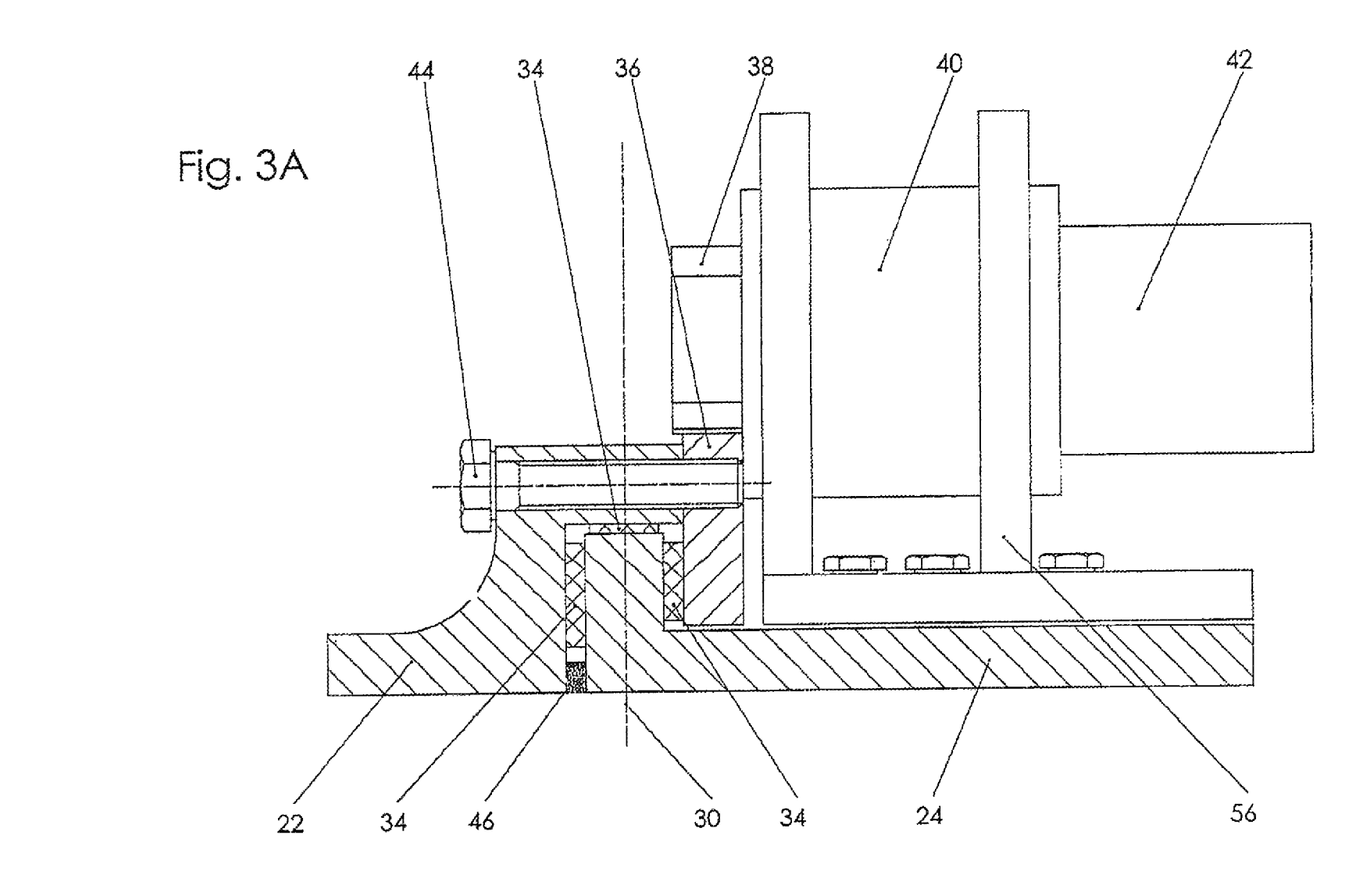

In FIG. 3A, the element 24 is equipped with three sliding-bearing elements 34 for receiving the axial and radial loads that are to be transmitted. They are tensioned via the element 22 and the clamping plate 36 with the screws 44. The clamping plate 36 is provided with a toothing on the inside. Into this inner toothing the pinion 38 engages that enables, via the gearbox 40 and the drive motor 42, the rotation of the element 22 relative to the element 24. Above the gearbox support 56, the gearbox 40 is firmly connected to the element 24. For weather protection of the sliding bearing the elements 22 and 24 are sealed against the outside with the seal 46.

Figure 3B:
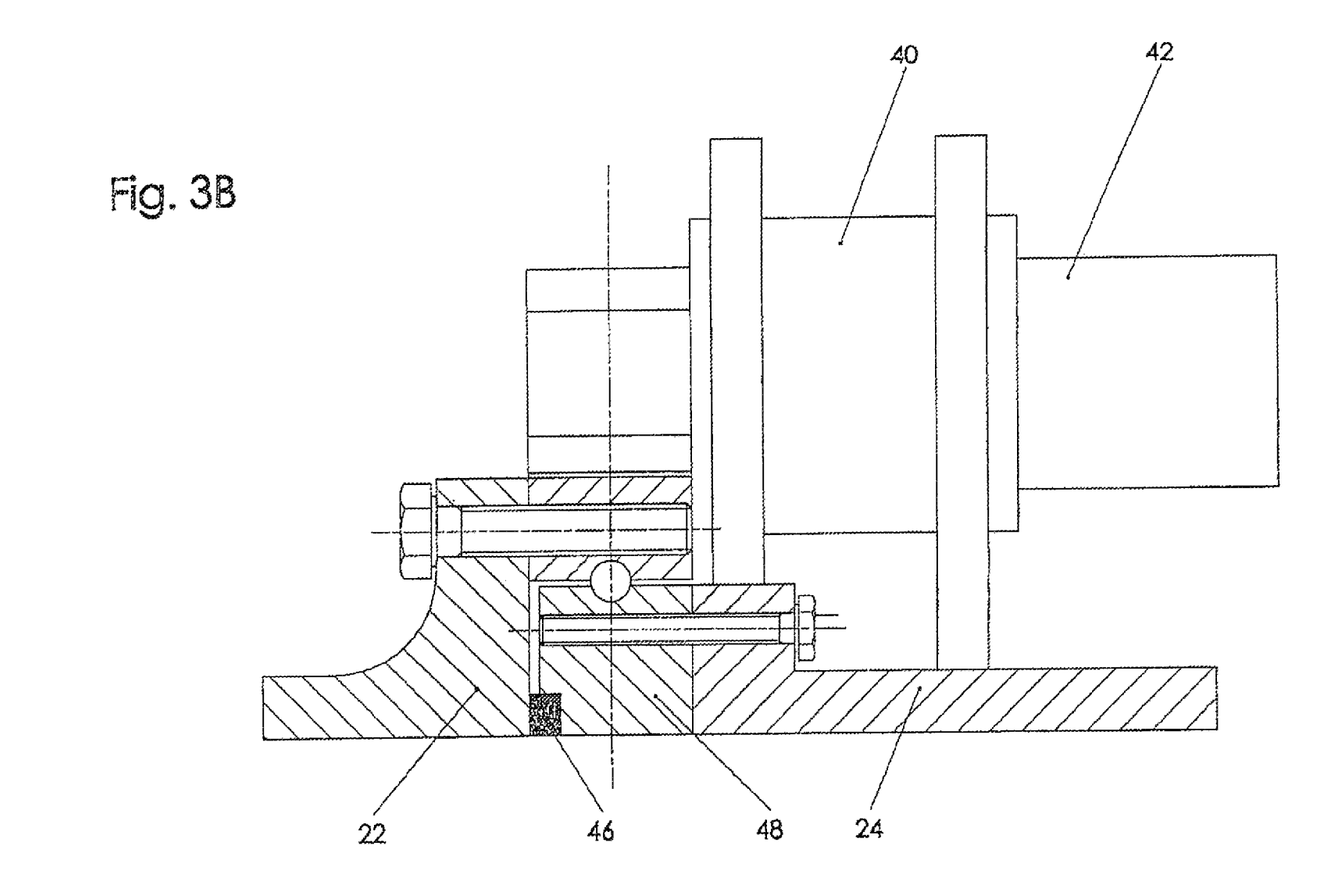

FIG. 3B shows the schematic design of a swivel bearing with a slewing ball bearing 48. Here the two rotating bearing rings are connected to the elements 22, 24. Here, too, a sealing element 46 protects the bearing unit against outside weather influences. The drive unit, consisting of gearbox 40 and drive motor 42, has the same structure as in the case of the sliding bearing, the required inner toothing being preferably mounted on the inner ring of the slewing ball bearing.

In addition, the swivel bearing must have at least two limit position switches for detecting the first and second positions so that the drive motor 42 can be switched off or the direction of rotation of the drive motor 42 can be reversed correspondingly.

Finally for the case that a grid outage has to be reckoned with, the plant is equipped with an emergency generating set or a battery storage unit that provide enough power for carrying out the swiveling movement. Preferably these power storing means are designed such that they are charged during the ongoing operation of the wind power plant so as to ensure the power supply of the at least one drive motor 42 during the switching-off process.

The invention claimed is:

1. A wind power plant comprising:
a tower having a substantially vertical tower axis (y);
a rotor having at least one rotor blade, said rotor having a rotor axis (x);
a power conversion unit connected to the rotor;
a head support interposed between the rotor and the tower and mounting the rotor on the tower, said head support including a first support element supporting the rotor, a second support element attached to the tower, and a swivel bearing interposed between the first support element and the second support element to enable the first support element to swivel relative to the second support element, said swivel bearing having a swiveling plane which lies between the rotor axis (x) and the tower axis (y); and
at least one motor for swiveling the rotor, along with the power conversion unit, by swiveling the first support element relative to the second support element from a first position in which the rotor axis (x) extends at least approximately in a horizontal direction into a second position in which the rotor axis (x) extends at least approximately in a vertical direction.

2. The wind power plant according to claim 1, wherein the swiveling plane lies in an angle bisector between the rotor axis (x) in the first position and the tower axis (y).

3. The wind power plant according to claim 1, wherein the rotor axis (x) and the tower axis (y) intersect in the swiveling plane.

4. The wind power plant according to claim 1, further comprising: means for storing power for the at least one motor, wherein power generated during operation of the wind power plant is fed to the storing means for the power supply of the at least one motor.

5. The wind power plant according to claim 1, wherein the swivel bearing includes a limit position switch for the first and the second positions.

6. The wind power plant according to claim 1, wherein the power conversion unit includes a rotor bearing, a generator, a gearbox, and a brake.

7. The wind power plant according to claim 1, wherein the rotor is a single-blade rotor with one rotor blade and a counterweight.

8. The wind power plant according to claim 1, further comprising: a vertical bearing interposed between the second support element and the tower to enable rotation of the head support about the substantially vertical tower axis (y).

9. The wind power plant according to claim 1, wherein the at least one motor is located within the head support.

10. A wind power plant comprising:
a tower having a substantially vertical tower axis (y);
a rotor having at least one rotor blade, said rotor having a rotor axis (x);
a power conversion unit connected to the rotor;
a head support interposed between the rotor and the tower and mounting the rotor on the tower, said head support including a first support element supporting the rotor, a second support element attached to the tower, and a swivel bearing interposed between the first support element and the second support element to enable the first support element to swivel relative to the second support element, said swivel bearing having a swiveling plane which lies between the rotor axis (x) and the tower axis (y); and
means for swiveling the rotor, along with the power conversion unit, from a first position in which the rotor axis (x) extends at least approximately in a horizontal direction into a second position in which the rotor axis (x) extends at least approximately in a vertical direction.

11. The wind power plant according to claim 10, wherein said swiveling means causes the rotor to be swiveled when a measured or a predetermined wind speed is exceeded.

12. The wind power plant according to claim 10, wherein the swiveling plane lies in an angle bisector between the rotor axis (x) in the first position and the tower axis (y).

13. The wind power plant according to claim 10, wherein the rotor axis (x) and the tower axis (y) intersect in the swiveling plane.

14. The wind power plant according to claim 10, further comprising: means for storing power for the at least one motor, wherein power generated during operation of the wind power plant is fed to the storing means for the power supply of the at least one motor.

15. The wind power plant according to claim 10, wherein the swivel bearing includes a limit position switch for the first and the second positions.

16. The wind power plant according to claim 10, wherein the power conversion unit includes a rotor bearing, a generator, a gearbox, and a brake.

17. The wind power plant according to claim 10, wherein the rotor is a single-blade rotor with one rotor blade and a counterweight.

18. The wind power plant according to claim 10, further comprising: a vertical bearing interposed between the second support element and the tower to enable rotation of the head support about the substantially vertical tower axis (y).

19. The wind power plant according to claim 10, wherein the means for swiveling the rotor is located within the head support.

* * * * *